(12) United States Patent
Magaldi et al.

(10) Patent No.: US 12,379,137 B2
(45) Date of Patent: Aug. 5, 2025

(54) PLANT AND METHOD FOR ACCUMULATION OF ENERGY IN THERMAL FORM

(71) Applicant: MAGALDI POWER S.P.A., Rome (IT)

(72) Inventors: Mario Magaldi, Salerno (IT); Fulvio Bassetti, Salerno (IT)

(73) Assignee: MAGALDI POWER S.P.A., Rome (IT)

( * ) Notice: Subject to any disclaimer, the term of this patent is extended or adjusted under 35 U.S.C. 154(b) by 981 days.

(21) Appl. No.: 17/417,894

(22) PCT Filed: Oct. 3, 2019

(86) PCT No.: PCT/IB2019/058410
§ 371 (c)(1),
(2) Date: Jun. 24, 2021

(87) PCT Pub. No.: WO2020/136456
PCT Pub. Date: Jul. 2, 2020

(65) Prior Publication Data
US 2022/0090827 A1   Mar. 24, 2022

(30) Foreign Application Priority Data

Dec. 28, 2018 (IT) .......... 102018000021301
May 28, 2019 (IT) .......... 102019000007416

(51) Int. Cl.
*F24S 60/00* (2018.01)
*F24S 20/20* (2018.01)
(Continued)

(52) U.S. Cl.
CPC .............. *F24S 60/00* (2018.05); *F24S 20/20* (2018.05); *F24S 20/40* (2018.05); *F24S 23/00* (2018.05);
(Continued)

(58) Field of Classification Search
CPC ................................ F28D 19/02; F24S 70/16
(Continued)

(56) References Cited

U.S. PATENT DOCUMENTS 3,196,251 A * 7/1965 De Bruyne ...... G05D 23/27541
392/382
3,989,927 A    11/1976 Erb
(Continued)

FOREIGN PATENT DOCUMENTS

AT    401419 B * 7/1996 .............. B01J 8/386
CH    472647 A  * 5/1969
(Continued)

OTHER PUBLICATIONS

International Search Report and Written Opinion for Corresponding International Application No. PCT/IB2019/058410 (12 Pages) (Jan. 22, 2020).

*Primary Examiner* — Jorge A Pereiro
(74) *Attorney, Agent, or Firm* — Lucas & Mercanti, LLP

(57) ABSTRACT

A plant for the accumulation and transfer of thermal energy, which plant has an accumulation device of the kind with a bed of fluidizable solid particles. The plant further has for each accumulation device
- electric resistor means arranged within the casing and thermally connected with the bed of particles, which electric resistors are configured for transmitting thermal energy generated by Joule effect to the particles and they are fed by exceeding electric energy from wind or photovoltaic source; and
- heat exchange means, also thermally connected with the bed of particles and which can be selectively actuated to receive thermal energy therefrom, (Continued)

the overall configuration being such that the thermal energy is transferred from the resistor means to the fluidizable solid particles of the bed and from the fluidizable solid particles to the heat exchange means.

22 Claims, 18 Drawing Sheets

(51) Int. Cl.
  *F24S 20/40* (2018.01)
  *F24S 23/00* (2018.01)
  *F24S 70/16* (2018.01)
  *F24S 80/20* (2018.01)
  *F24S 80/40* (2018.01)
  *F28D 13/00* (2006.01)
  *F28D 19/02* (2006.01)

(52) U.S. Cl.
  CPC .............. *F24S 70/16* (2018.05); *F24S 80/20* (2018.05); *F24S 80/40* (2018.05); *F28D 13/00* (2013.01); *F28D 19/02* (2013.01)

(58) Field of Classification Search
  USPC .................................................. 165/104.16
  See application file for complete search history.

(56) References Cited

U.S. PATENT DOCUMENTS

| | | | |
|---|---|---|---|
| 4,038,557 A * | 7/1977 | Gildersleeve, Jr. | F24S 10/80 60/641.14 |
| 4,153,047 A | 5/1979 | Dumbeck | |
| 4,177,765 A * | 12/1979 | Wehrmeister | F22B 35/00 110/263 |
| 4,222,365 A * | 9/1980 | Thomson | F28D 20/0056 60/659 |
| 4,245,693 A * | 1/1981 | Cheng | F22B 31/0023 122/4 D |
| 4,340,400 A * | 7/1982 | Campanile | F28D 13/00 55/342 |
| 4,362,149 A * | 12/1982 | Thomson | F24D 11/007 165/104.34 |
| 6,047,105 A | 4/2000 | Lentz | |
| 2014/0053792 A1 | 2/2014 | Park et al. | |
| 2014/0251307 A1 | 9/2014 | Nix | |
| 2017/0191697 A1 * | 7/2017 | Xiao | F24S 20/20 |

FOREIGN PATENT DOCUMENTS

| | | | | |
|---|---|---|---|---|
| DE | 102011017311 A1 | 10/2012 | | |
| DE | 202012103544 U1 | 12/2013 | | |
| FR | 1176174 A | 4/1959 | | |
| GB | 1194484 A | 6/1970 | | |
| JP | S63223454 A | 9/1988 | | |
| JP | 2004350487 A | 12/2004 | | |
| KR | 20100052248 A | 5/2010 | | |
| NL | 8001778 A * | 10/1980 | ................. | F24J 2/42 |
| WO | 0019154 A1 | 4/2000 | | |
| WO | WO-2011000522 A2 * | 1/2011 | ............. | F01K 23/04 |
| WO | WO-2011027309 A2 * | 3/2011 | ............. | F03G 6/065 |
| WO | WO-2012049655 A1 * | 4/2012 | ................ | F22B 1/00 |
| WO | 2013110804 A2 | 8/2013 | | |
| WO | 2013150347 A1 | 10/2013 | | |
| WO | WO-2017021832 A1 * | 2/2017 | ............... | F03G 6/06 |
| WO | 2017140481 A1 | 8/2017 | | |
| WO | 2018142292 A1 | 8/2018 | | |
| WO | 2018215808 A1 | 11/2018 | | |
| WO | 2018234707 A1 | 12/2018 | | |

* cited by examiner

PLANT AND METHOD FOR ACCUMULATION OF ENERGY IN THERMAL FORM

CROSS-REFERENCE TO RELATED APPLICATIONS

This application is a 371 of PCT/IB2019/058410, filed Oct. 3, 2019 which claims the benefit of Italian Patent Application No. 102018000021301, filed Dec. 28, 2018 and Italian Patent Application No. 102019000007416, filed May 28, 2019.

TECHNICAL FIELD OF THE INVENTION

The present invention mainly relates to a plant and a method for the accumulation of energy in thermal form. In particular, the invention uses devices for the accumulation of thermal energy which use a bed of fluidizable solid particles.

BACKGROUND OF THE INVENTION

Low-cost plants for the production of electric energy from renewable source, in particular of photovoltaic and wind type, are known.

In the last ten year, the use of photovoltaic plants in Italy and all over the world has significantly increased, and of the wind component as well, even and above all in view of decarbonisation (use of energy sources free from atmospheric emissions of $CO_2$). With the increasing component of production from renewable sources for their discontinuous nature, like indeed wind and sun, situations are more and more often determined wherein, during some time periods an excess of not exploited energy availability occurs, to the detriment of the overall exploitation of the production. Moreover, in order to compensate the reduced energy availability from renewable sources in other time periods, the energy supply from fossil or nuclear fuels or from big hydroelectric plants is required.

Moreover, the cost of the electric energy is subjected to considerable variations linked to the trend of the energy market and when there is a considerable difference between maximum value and minimum value, purchasing it at the minimum cost, accumulating it and then delivering it in subsequent times at a higher value results to be an opportunity.

In order to solve the above-mentioned drawbacks, sometimes one has recourse to electrochemical batteries which however do not allow to store important energy levels. Moreover, some used electrochemical accumulation systems are the most critical element of the whole production system, above all due to their short useful life, the high investment cost with respect to performances, the dependence of the latter upon the environmental temperature, the risk of fires, the need for conditioning plants (to keep the wished temperature), the use of polluting metals, the limited availability, the need for disposal at the end of operation and, in any case, the above-mentioned limited capability of accumulation of the amount of energy required to guarantee a continuity of supply under each environmental condition.

SUMMARY OF THE INVENTION

The technical problem placed and solved by the present invention is then to overcome the drawbacks mentioned above with reference to the known art, by making available a plant for accumulating energy in thermal form of particular effectiveness, especially to guarantee an operation continuity in supplying electric or thermal energy to a final user.

The above-mentioned technical problem is solved by a plant according to claim 1 and a method according to claim 21.

Preferred features of the invention are set forth in the depending claims.

The invention is based upon a device allowing an accumulation of energy, in thermal form, in a bed of fluidizable solid particles and a contemporary or subsequent transfer and/or conversion of the accumulated energy, so as to allow a programmable and flexible use of the outgoing energy based upon the needs of a final user. Advantageously, the accumulated energy can be re-transformed into electric energy or directly used in thermal form, for example for the district heating or desalination plants, or even be subjected to a combined use of such two forms in civil or industrial applications.

The thermal energy accumulated in the bed of particles is produced by components inserted in the same bed or thermally connected thereto, which exploit electric energy available in excess in the grid, due to the production excess, supplied for example by one or more photovoltaic, wind power systems or systems associated to different energy sources, or due to the reduction of the users' loads. In general terms, the proposed device accumulates in thermal form the electric energy coming from other sources, for example electric energy available in excess with respect to the requirements of a user, in particular the energy produced by wind or photovoltaic plants.

Alternatively, or in combination with what just illustrated, for the accumulation of thermal energy thermal waste coming from several sources, for example steel works, cement plants, thermoelectric plants or other industrial processes, can be exploited. In this case, the power thermal energy can be exploited by heating a fluidization gas of the bed of particles or by inserting dedicated heat exchangers into such bed of particles.

Said electric or thermal power systems of the bed's heating components can be inserted into the same plant which receives the bed of particles or they can be in a separate and/or remote position with respect thereto.

Moreover, several power sources can be used in different phases of the heating of fluidized bed, that is for different temperature ranges.

The components heating the bed of particles can be immersed into the bed itself and include, for example, electric resistors, heat pump elements or other.

Such components or heating elements immersed into the bed of particles can provide a protection obtained with suitable layers, or screens, of material resistant to high temperatures, for example ceramic or refractory means.

In case of use of resistors, they, as it is known, produce thermal energy by Joule effect.

In case of use of heat pumps, still as it is known they are thermal machines capable of transferring thermal energy from a source having a lower temperature to a source having a higher temperature, by using electric energy. The source having lower temperature can be represented, for example, by the external environment or by thermal residues (waste) of industrial processes.

Advantageously, the heating components, particularly the resistors and/or a condenser of the heat pump, can be connected to a base or to side walls of a casing of the device.

The bed of particles can include, or consist of, sand or other suitable material with high specific heat. In preferred configurations, the bed's particles reach accumulation temperatures≥about 600° C. and more preferably comprised in a range of about 700-1000° C.

As mentioned above, the bed is preferably fluidized by means of a system for supplying and distributing a fluidization gas, typically air.

Fluidization can involve a specific operating region of the bed, for example a section directly in contact with the electric resistances, with the condenser of the heat pump or with other heating component, or the whole bed of particles. Advantageously, the fluidization system can provide several fluidization units which can be activated independently from one another and/or a possibility of independent fluidization of selected parts of the bed, that is a "compartmentation" of fluidization.

In a further preferred embodiment, the heating components, for example the above-mentioned electric resistors, can be arranged to heat the fluidization gas of the bed of particles, then by supplying thermal energy to such bed through said fluidization gas.

Moreover, the heating components can heat gas to be supplied in other points of the device, for example in the area of free surface, or freeboard, of the bed of particles.

In embodiment variants, the heating elements can also, or only, heat an operating fluid or carrier, for example air or water, running across heat exchangers, for example with tube bundles, immersed into the bed of particles.

In these variants, the heating elements can be applied to heat, in particular up to over 800-900° C., said operating fluid or gas.

The accumulation plant is configured to transfer, as said in deferred way, the thermal energy to another component and/or plant for the production and supply of electric energy and/or of thermal energy. To this purpose, the accumulation device can include, or be associated to, one or more of the following components of heat exchange:

elements of thermoelectric, thermionic and/or thermo-photovoltaic type, or still of different type, capable of performing the conversion of the accumulated thermal energy into electric energy;

heat exchangers—housed within the accumulation device and inserted or lapped by the bed of particles—wherein an operating fluid flows, in particular for feeding a thermodynamic cycle for the production of electric energy;

heat exchangers belonging to a heat pump, which subtracts thermal energy to the bed of particles to cede it to other environment which uses it according to needs;

heat exchangers operating, generally, to heat a fluid, typically steam, for the direct and efficient use of the thermal energy for civil, agriculture or industrial uses.

Preferably, even such heat exchange components—if immersed in the bed of particles or lapped thereby—are protected by suitable layers, or screens, of material resistant to high temperatures, for example ceramic or refractory means.

Preferably, said heat exchange components can be activated selectively, for example by means of electric switches and/or valves, independently from one another, so as to intervene or be deactivated according to the real request for electric and/or thermal energy of the downstream user.

The transfer of thermal energy from the accumulation device can also take place, alternatively or together with the described modes, by using directly the hot fluidization gas outgoing from the bed of particles. Such gas, used wholly or partially, is preferably dusted by means of cyclones or ceramic filters resistant to the high temperatures, before it is sent to the downstream users.

Based upon preferred embodiments, two configurations of the accumulation device are provided, as illustrated hereinafter.

A first embodiment is based upon a configuration, which will be called "closed", wherein the bed of particles is housed within a casing which has no openings towards the external environment. Therefore, in this configuration the thermal energy accumulated by the bed of particles is produced exclusively by the above-mentioned heating components.

In a second embodiment a configuration is provided, which will be called "open", wherein the device has a casing provided with an opening towards the external environment. Through such opening, the thermal energy associated to a solar radiation concentrated by a suitable optical system can be transferred to the bed of particles. The opening can allow a direct connection, without screens, between external and internal environment or be provided with a panel, or window, transparent to the solar radiation.

Such use of the solar energy thermal potential, possibly concentrated by heliostats, for the production of electric energy is known in the art. In particular, devices for the accumulation and the transfer of said thermal energy based upon a bed of fluidizable solid particles exposed, directly or indirectly, to the solar radiation are made known, for example in WO2013/150347A1 and WO2017/021832A1.

In this second embodiment, then, the thermal energy accumulated in the fluidized ben can come from two contributions: a contribution of primary energy, such as the solar radiation concentration by the optical system and absorbed by the fluid bed, and a contribution of secondary energy, such as the electric energy converted into thermal energy by means of the heating components associated to the same fluidizable bed.

This last embodiment is particularly advantageous when it is required to guarantee a constant availability of thermal energy under any weather conditions to feed industrial processes requiring continuity, such for example thermal desalination.

The proposed accumulation system, as said, accumulates thermal energy, preferably from renewable sources, to produce flexibly electric and/or thermal energy. It can use a plurality of accumulation devices, each one thereof implementing a module which can be multiplied as wished to produce electric and thermal energy at the service of communities and industrial plants 24 h/365 d and it represents a sustainable alternative, apart from durable and economic, to the current electro-chemical accumulation systems, as well as to the systems for producing fossil fuel energy.

The sofar described system can accumulate thermal energy for amounts measurable up to tens of GWh, then suitable to serve large-sized turbines having high level of efficiency.

Moreover, with respect to the known art the system is capable of providing important services for the stability of the electricity grid, the latter, as said, more and more precarious due to the continuous increase in the discontinuous renewable energies and thus to allow to abandon the traditional sources based upon fossil or nuclear sources.

Another advantage of the proposed system is the independence from the latitude, since it can be installed in any country in the world, under any climatic condition, by providing low-cost essential services, and having zero environmental impact, to the environment and population well-being.

Additional advantages, features and use modes of the present invention will result evident from the following detailed description of some embodiments thereof, shown by way of example and not for limitative purposes.

BRIEF DESCRIPTION OF THE FIGURES

The figures of the enclosed drawings will be referred to, wherein.

The sizes shown in the above-mentioned figures are to be meant as purely exemplifying and they are not necessarily represented proportionally.

DETAILED DESCRIPTION OF THE INVENTION

Embodiments and variants of the invention will be described hereinafter, and this with reference to the above-mentioned figures.

Analogous components are designated with the same numeral reference in the several figures.

In the following detailed description, additional embodiments and variants with respect to embodiments and variants already treated in the same description will be illustrated limited to the differences with respect to what already illustrated.

Moreover, the several embodiments and variants described hereinafter, as well as the relative components, means and elements, are likely to be used in combination.

Figure 1A:
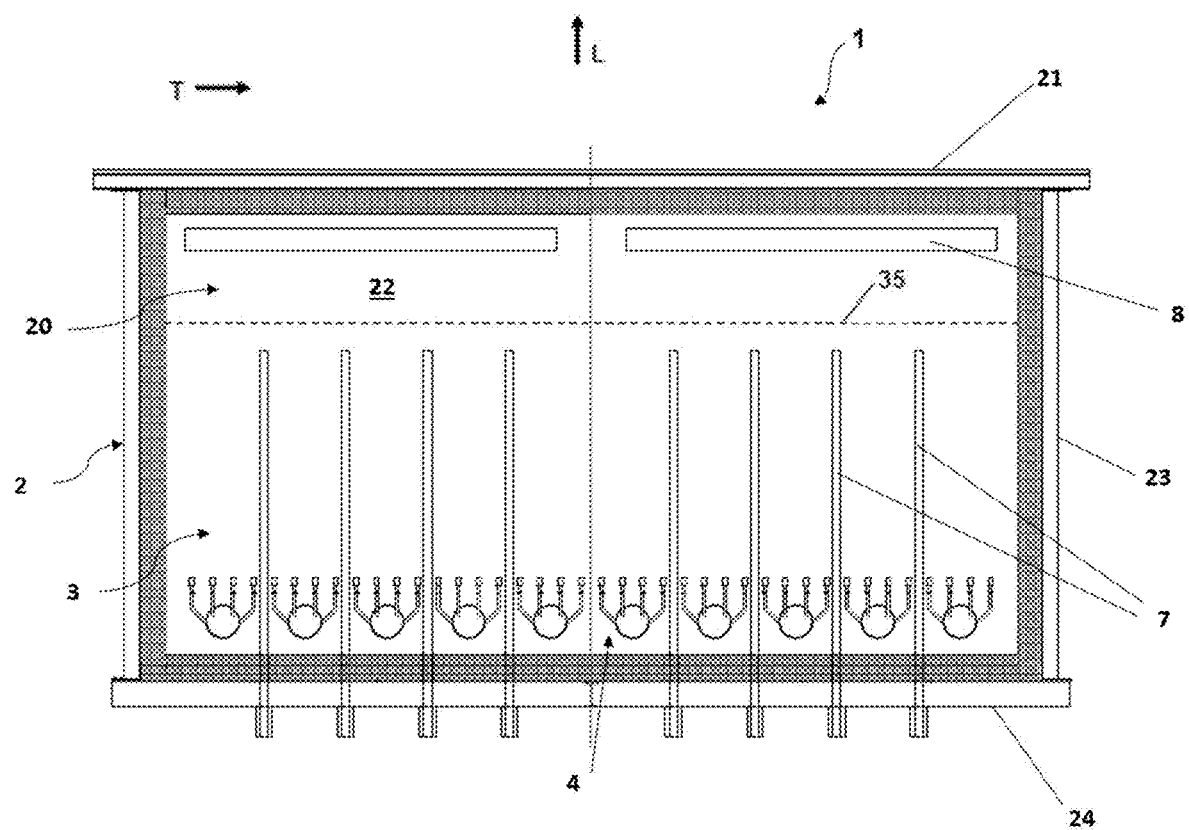
FIG. 1a relates to a first preferred embodiment of a device for accumulating and transferring thermal energy of a plant according to the invention, which device comprises electric resistors inserted in a bed of fluidizable particles, in closed configuration and provided with thermionic, thermoelectric and/or thermo-photovoltaic components for the direct transformation of thermal energy into electric energy, by showing a schematic representation thereof in longitudinal section.

With reference to FIG. 1a, a device for accumulating and transferring thermal energy according to a first preferred embodiment of the invention is designated as a whole with 1.

The device is intended to be used in a plant provided with the function of accumulating and transferring thermal energy, in particular an electric and/or thermal energy production plant.

The device 1 first of all comprises a containment casing 2, which defines an internal compartment 20, the latter configured to house a bed 3 of fluidizable particles.

The casing 2 can have polygonal, for example cubic or parallelepiped, geometry. In the present example, the casing 2 has an upper wall 21, a side skirt 23 and a lower wall or base 24.

With respect to the geometry of the device 1, we can define a longitudinal direction L, in the present example vertical direction, and a cross direction T, orthogonal to the longitudinal direction L and in this example, then, horizontal direction.

The device 1 is here configured in closed form, that is it does not have openings towards the external environment and, preferably, it is thermally insulated with respect thereto.

The bed of fluidizable particles 3 is of granular type, that is formed by solid particles.

The preferred granular material type for the bed of particles of the device 1 has features of high capability, conductivity and thermal diffusivity.

The bed 3 occupies the internal compartment 20 so as to leave, even in use, a free space 22, or freeboard, above its own free surface 35. Particularly, the space 22 is limited on the lower side by the free surface 35, on the upper side by the wall 21 of the casing 2 and laterally by the skirt 23 of the casing itself.

The bed of particles 3 is preferably set in motion by fluidizing means, designated as a whole with 4 and configured to supply and distribute a fluidization gas, in particular air, through the same bed of particles 3. In the present embodiment, the means 4 comprises a plurality of elements for supplying or introducing fluidization air, arranged at the lower base 24 of the casing 2, that is the bed of particles 3.

The fluidization air path within the bed of particles 3 then is from bottom to top, in particular vertical or substantially vertical. In more general terms, the introduction of fluidization gas takes place according to the longitudinal direction L.

The fluidization gas coming from the bed of particles 3 is collected within the free area, or freeboard 22, and it is captured by suitable (not illustrated) extractor hoods placed on the upper wall 21.

Advantageously, means can be provided for selectively varying the speed and/or the flow rate of the fluidizing gas. In the same way, a selective and/or differentiated fluidization of parts of the bed of particles can be provided.

One or more electric resistors, or resistances, 7 are positioned inside the bed of particles 3, and preferably wholly immersed therein. In the present embodiment, they are introduced, by way of example, from the base of the bed of particles and they extend in longitudinal direction L.

Said resistors 7 are fed by means for the production of electric energy, for example of photovoltaic and/or wind type, and preferably they are protected by (not illustrated) screens resistant to high temperatures, such as for example layers of ceramic material.

In the free area, or freeboard 22, one or more heat exchange components 8 are housed, which can be connected to, or mounted on, the wall 21 of the casing 2. The heat exchange components 8 are thermally connected to the bed of particles 3 and can be activated by systems such as (not illustrated) electric switches. In the present example, advantageously the components 8 are of thermoelectric, thermionic, thermo-photovoltaic type or a combination thereof. The components 8 are configured for a direct transformation of thermal energy into electric energy and then they indeed convert the thermal energy of the bed of particles 3 into electric energy usable by users of any type.

The components 8 can be housed even inside the bed of fluidized particles 3, and then they are immersed into—or lapped by—the fluidized particles.

Even the components 8 are preferably protected by (not illustrated) screens resistant to high temperatures or abrasion, such as for example layers of ceramic material.

Figure 1B:
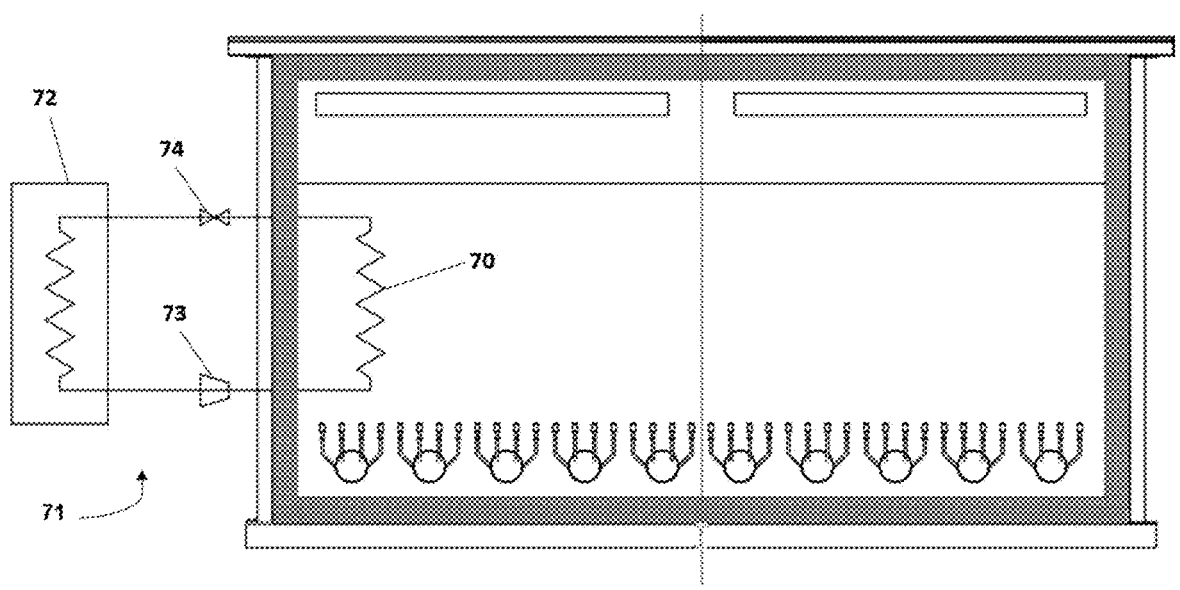
FIG. 1b relates to a first embodiment variant of the device of FIG. 1a, wherein in place of the resistors a heat pump is used.
Figure 1C:
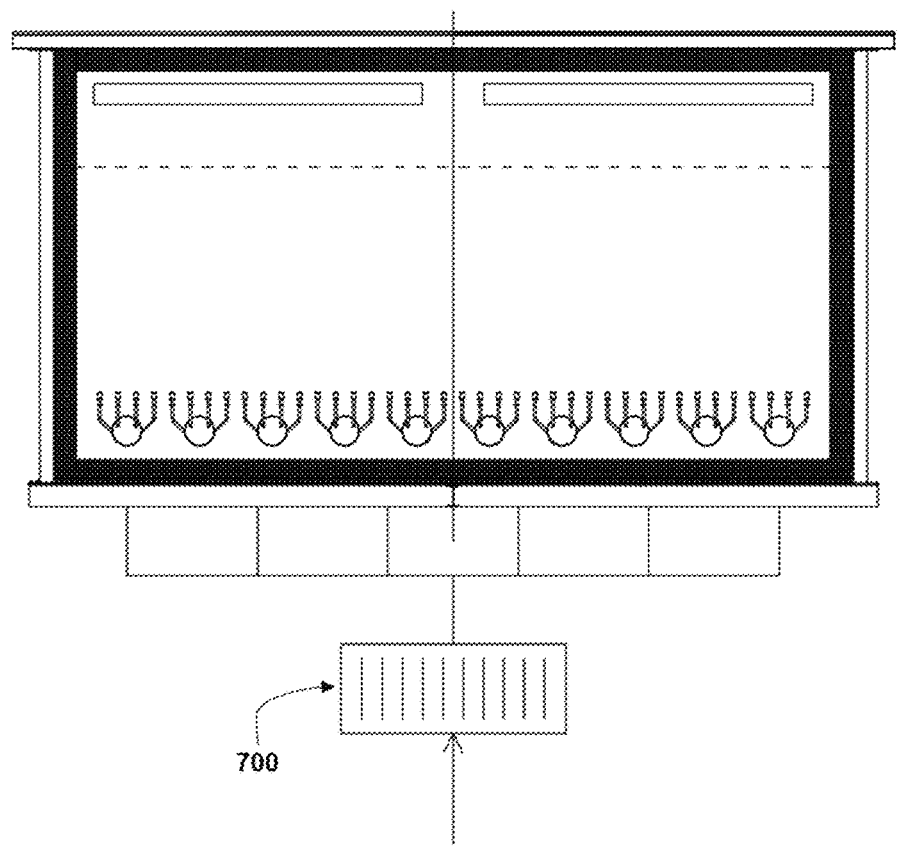
FIG. 1c relates to a second embodiment variant of the device of FIG. 1a, wherein in place of the resistors heaters associated to a circuit for supplying fluidization gas are used.
Figure 1D:
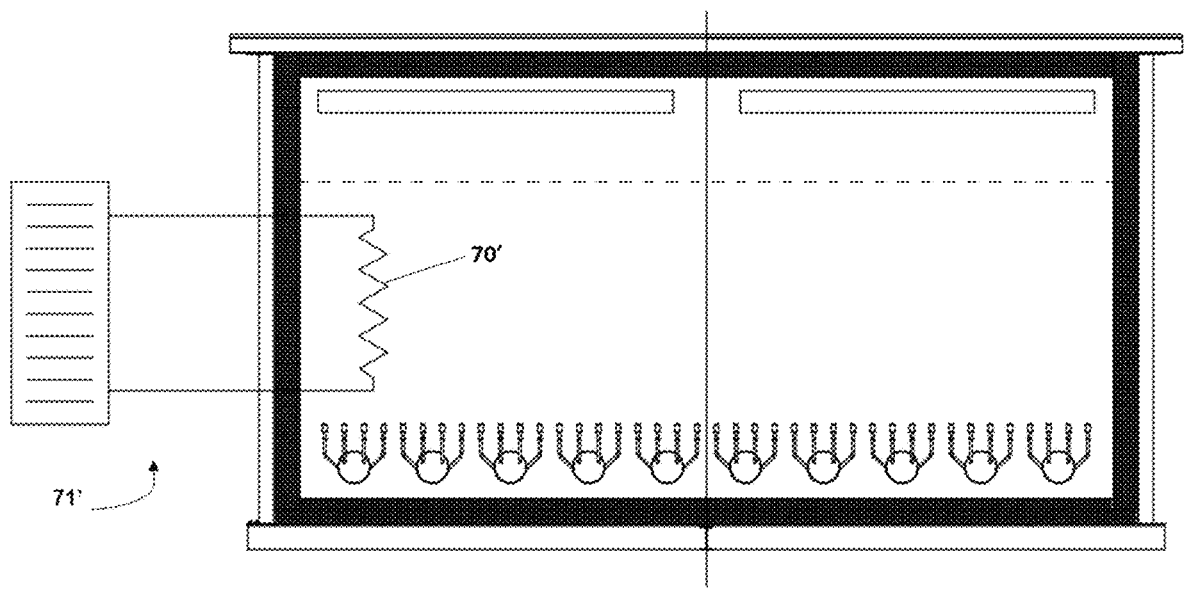
FIG. 1d relates to an embodiment variant of the device of FIG. 1c, which provides heaters used to heat an operating fluid, for example air or water, flowing in suitable heat exchangers inserted into the bed of particles.

FIGS. 1b, 1c and 1d show each one a respective embodiment variant of the device of FIG. 1a, wherein the electric resistors 7 are replaced by different heating means or components of the bed of particles, indeed configured to convert an inlet energy, particularly electric energy, into heating thermal energy of the bed of particles 3.

In FIG. 1b, inside of the bed of particles 3 heat exchangers 70 are positioned belonging to a circuit of a heat pump 71, the latter comprising a second exchanger 72, in contact with a low temperature source, a compressor 73 and a lamination valve 74.

In the variant of FIG. 1d, the exchangers immersed into the bed of particles, designated with 70', are part of a heat exchange circuit 71' based upon the use of an operating fluid.

In FIG. 1c, inside the circuit for supplying the fluidization gas, air heaters 700 are inserted which increase the temperature of the gas inletting the bed of particles 3, by allowing to increase the contained thermal energy thereof.

Figure 2A:
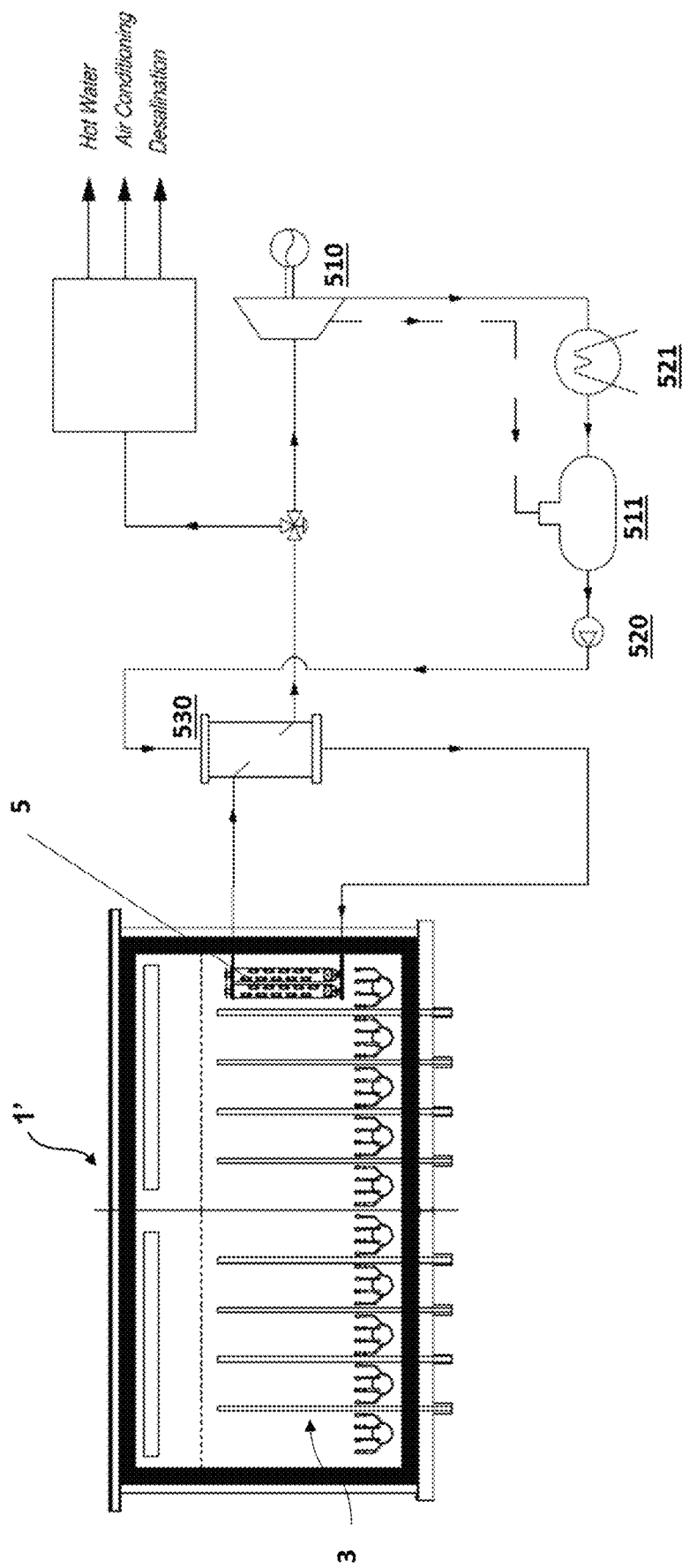
FIG. 2a relates to a second preferred embodiment of the device for accumulating and transferring thermal energy of a plant according to the invention, wherein to the configuration of FIG. 1a heat exchangers inserted into the bed of particles have been added, by showing a schematic representation thereof in longitudinal section.

FIG. 2a relates to a second embodiment of the device according to the invention, herein designated with 1'. The device 1' is different from that of the first embodiment and related variants as above described due to the fact of having further heat exchange elements housed within the bed 3, in particular tube bundles 5. Such tube bundles 5 can be crossed by an operating fluid, for example water in the liquid and/or steam state, and receive heat from the particles of the bed 3.

In particular, in the configuration of FIG. 2a, the operating fluid outgoing from the device 1' through the tube bundles 5, under conditions of design temperature and pressure, can be made to expand in a turbine 510 coupled to a generator for the production of electric energy or can be used for other industrial purposes, for example for the production of hot water, in conditioning systems or desalination plants. In other words, the tube bundles 5 are connected to further components of the plant wherein the device 1' is inserted, for example one or more turbines 510, condensers 521, attemperators 530, intermediate heat exchangers 511, pumps 520 and so on, each one known on itself.

Embodiment variants can provide, as single components or heat exchange elements associated to the bed of particles 3, the tube bundles 5.

Similarly to the FIGS. 1b to 1d, FIGS. 2b, 2c and 2d show each one a respective embodiment variant of the device of FIG. 2a, wherein the electric resistors 7 are replaced by different heating means or components of the bed of particles, indeed configured to convert an inlet energy, particularly electric energy, into heating thermal energy of the bed of particles 3.

Figure 2B:
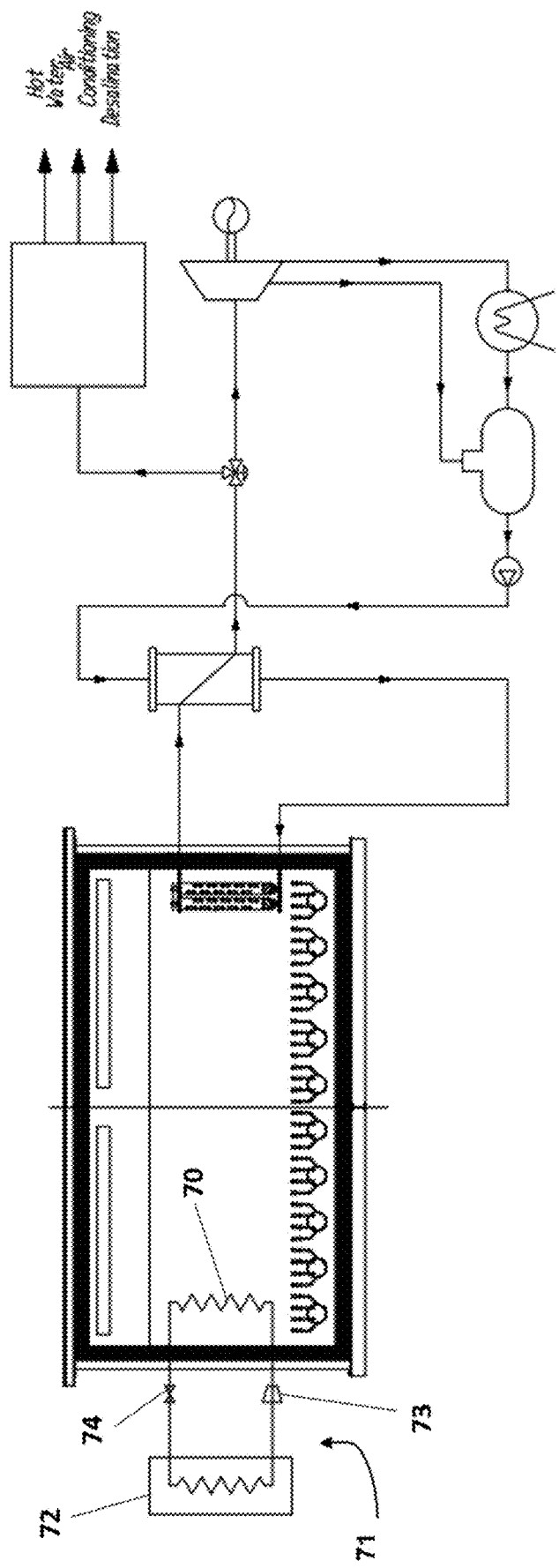
FIG. 2b relates to a preferred embodiment variant of the device of FIG. 1b, wherein heat exchangers inserted into the bed of particles have been added, by showing a schematic representation thereof in longitudinal section.

In FIG. 2b, inside the bed of particles 3 heat exchangers 70 are positioned, belonging to a circuit of a heat pump 71, the latter comprising a second exchanger 72, in contact with a low temperature source, a compressor 73 and a lamination valve 74.

Figure 2C:
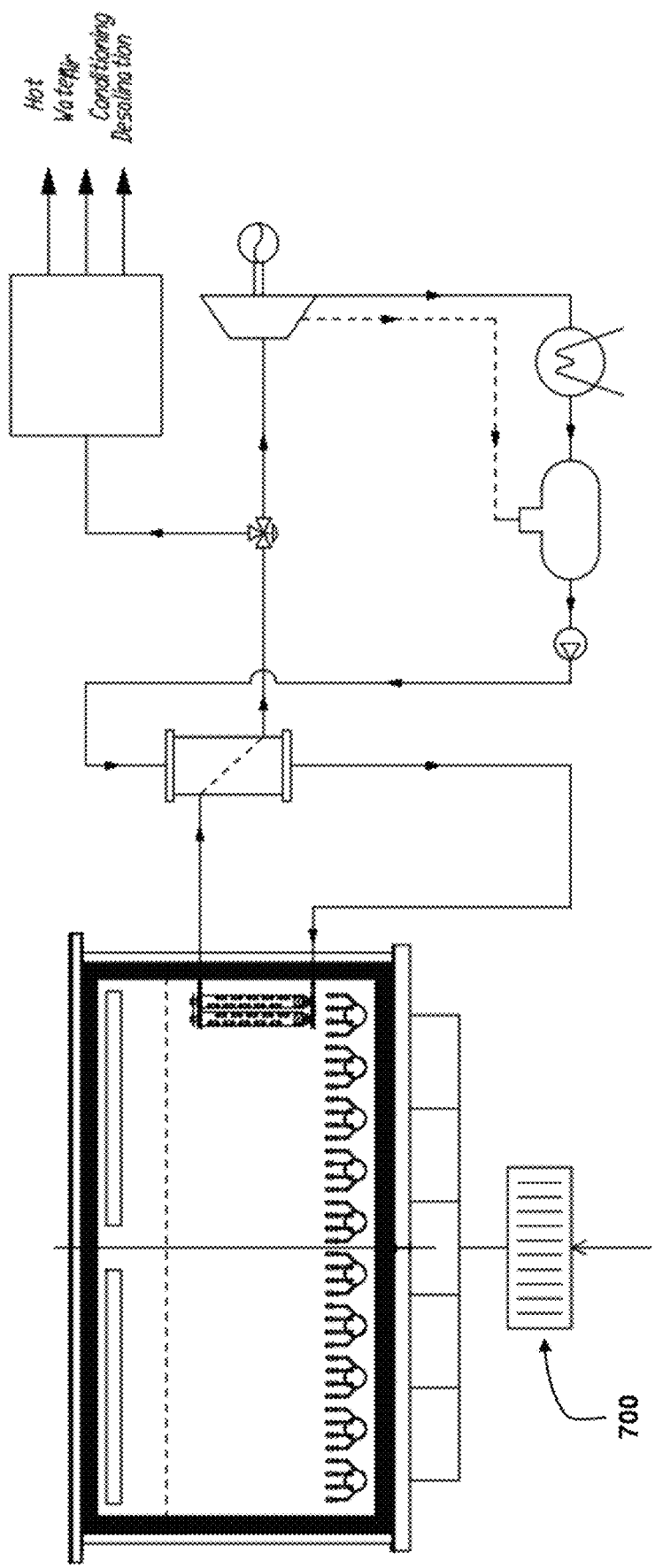
FIG. 2c relates to a preferred embodiment variant of the device of FIG. 1c, wherein heat exchangers inserted into the bed of particles have been added, by showing a schematic representation thereof in longitudinal section.
Figure 2D:
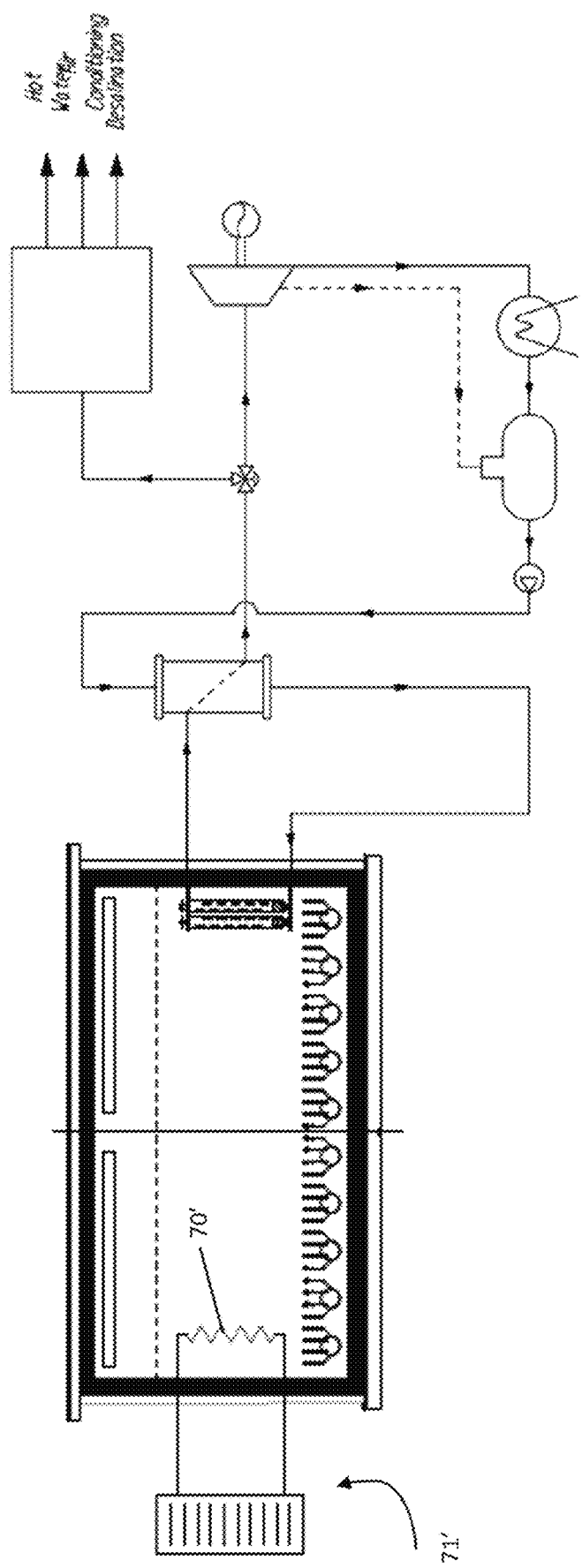
FIG. 2d relates to a preferred embodiment variant of the device of FIG. 1d, wherein heat exchangers inserted into the bed of particles have been added, by showing a schematic representation thereof in longitudinal section.

In the variant of FIG. 2d, the exchangers immersed into the bed of particles, designated with 70', are part of a heat exchange circuit 71' based upon the use of an operating fluid.

In FIG. 2c, inside the circuit for supplying the fluidization gas, air heaters 700 are inserted which increase the temperature of the gas inletting the bed of particles 3, by allowing to increase the thermal energy supplied thereby.

Figure 3A:
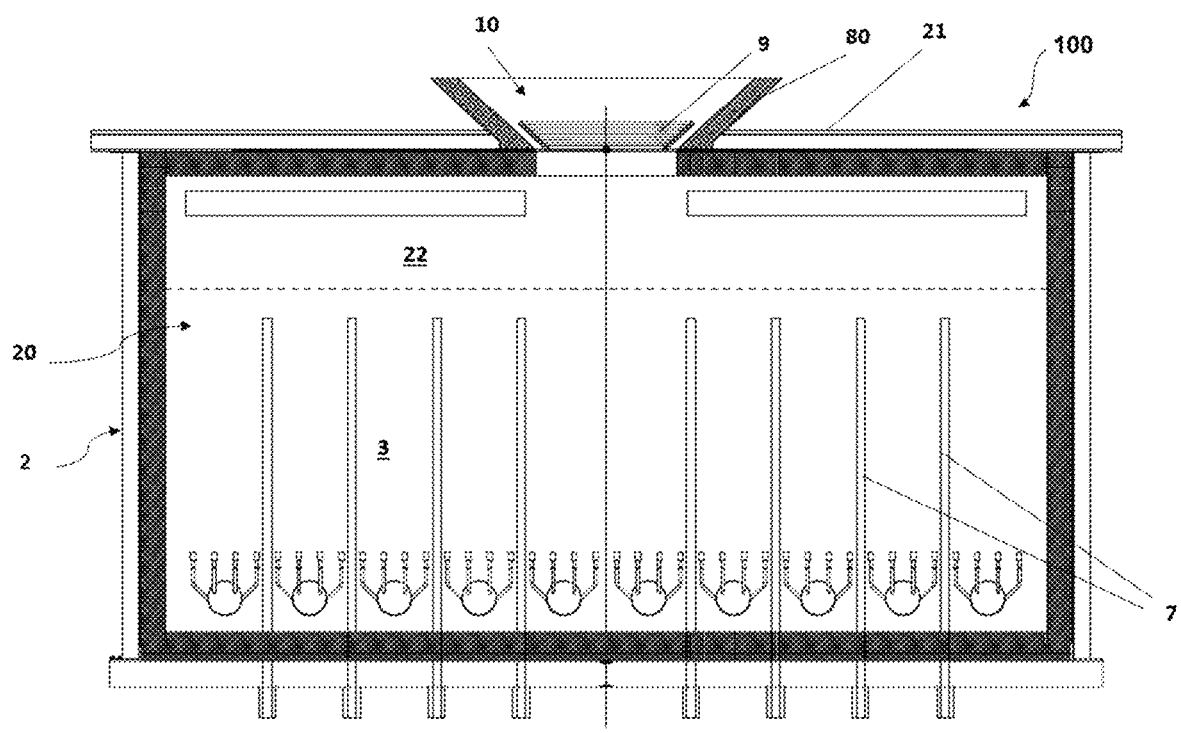
FIG. 3a relates to a third preferred embodiment of the device for accumulating and transferring thermal energy of a plant according to the invention, which uses electric resistors, in open configuration and provided with thermionic, thermoelectric and/or thermo-photovoltaic components for the direct transformation of thermal energy into electric energy, by showing a schematic representation thereof in longitudinal section.

FIG. 3a relates to a third preferred embodiment of the device of the invention, herein designated with 100. With respect to the device described with reference to the first embodiment and relative above-illustrated variants, the device 100 has an irradiation opening 10 at the upper wall 21 of the casing 2. A (not illustrated) optical system, associated to the device 100, concentrates the incident solar radiation indeed inletting such opening 10 and within the compartment 20. In this way, the particles of the bed 3 absorb primary thermal energy, of solar origin.

In the present example, the opening 10 is shown as arranged at the upper wall 21 of the casing 2 and preferably centred longitudinally with respect thereto. Embodiment variants can provide a different positioning thereof. In the same way, the opening 10, under operating conditions, can be wholly open towards outside, without shielding or covering means, or it can have a protection window transparent to the incident solar radiation.

The herein considered configuration allows to accumulate thermal energy from the power supply of the electric resistors 7 or other already mentioned components and from the solar radiation concentrated through the irradiation opening 10.

FIG. 3 also shows a shaped confinement structure 80, or invitation, of the device 100, arranged at the mouth of the irradiation opening 10. The confinement structure 80 can develop wholly or mainly outside the device 100, that is it can or cannot project partially within the empty space 22.

The confinement structure 80 has a through-opening, that is it has tubular structure, so as to keep the direct communication between inside and outside of the casing 2 by means of the irradiation opening 10.

In an embodiment variant, the confinement structure 80 defines a calm chamber helping the freeboard 22 to avoid or reduce leakages of air and/or particles towards outside.

In the present embodiment variant, the confinement structure 80 has a tapered, in particular conical, shape with decreasing section towards inside of the casing 2. Such section of the confinement structure allows not to interfere with the direction of the solar radiation concentrated by the dedicated optical system.

Moreover, in the present embodiment variant the device 100 comprises an auxiliary device 9, arranged at the confinement structure 80 or, in general terms, of the irradiation opening 10. The auxiliary device 9 is constituted by thermoelectric and/or thermionic and/or thermophotovoltaic panels and it is configured so as to be directly exposed to the incident solar radiation for the generation of electric energy.

Alternatively, the device 9 is constituted by a heat exchanger apt to absorb directly the heat of the solar radiation by means of its own carrier fluid.

Figure 3B:
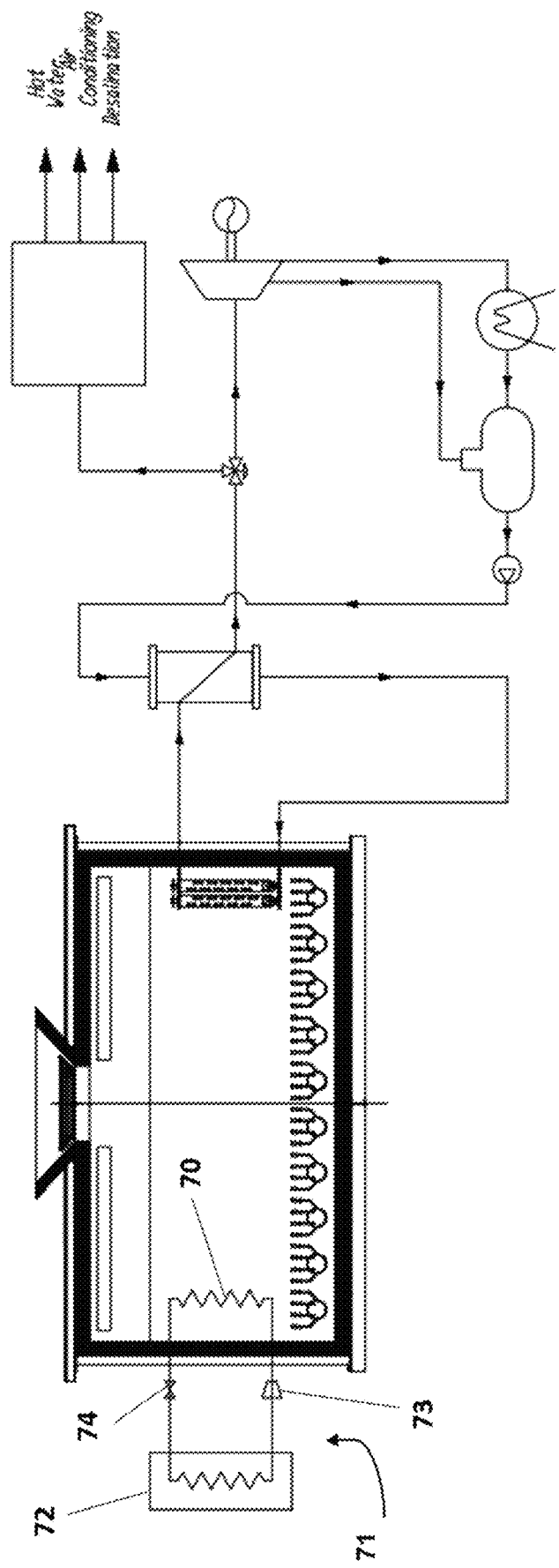
FIG. 3b relates to the same embodiment variant of FIG. 2b, in an alternative configuration of open type, by showing a schematic representation thereof in longitudinal section.
Figure 3C:
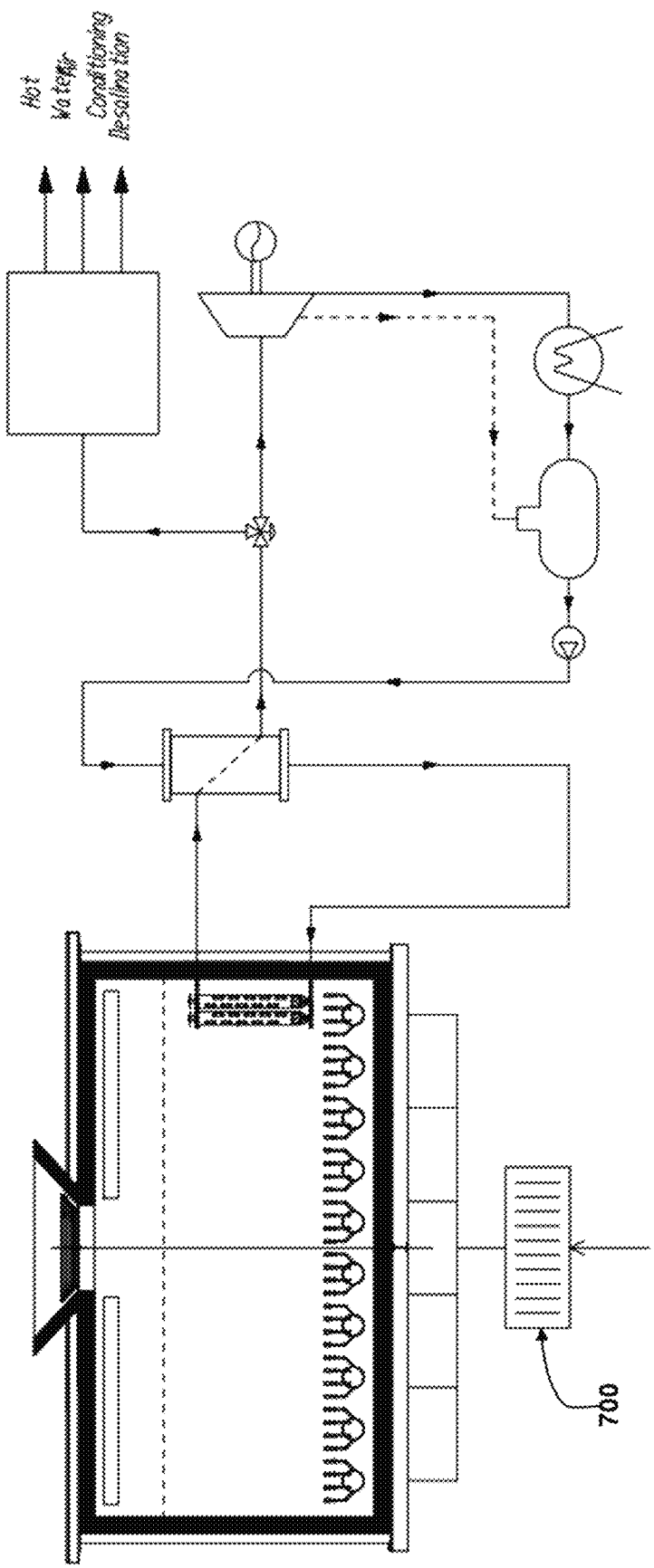
FIG. 3c relates to the same embodiment variant of FIG. 2c, in an alternative configuration of opened type, by showing a schematic representation thereof in longitudinal section.
Figure 3D:
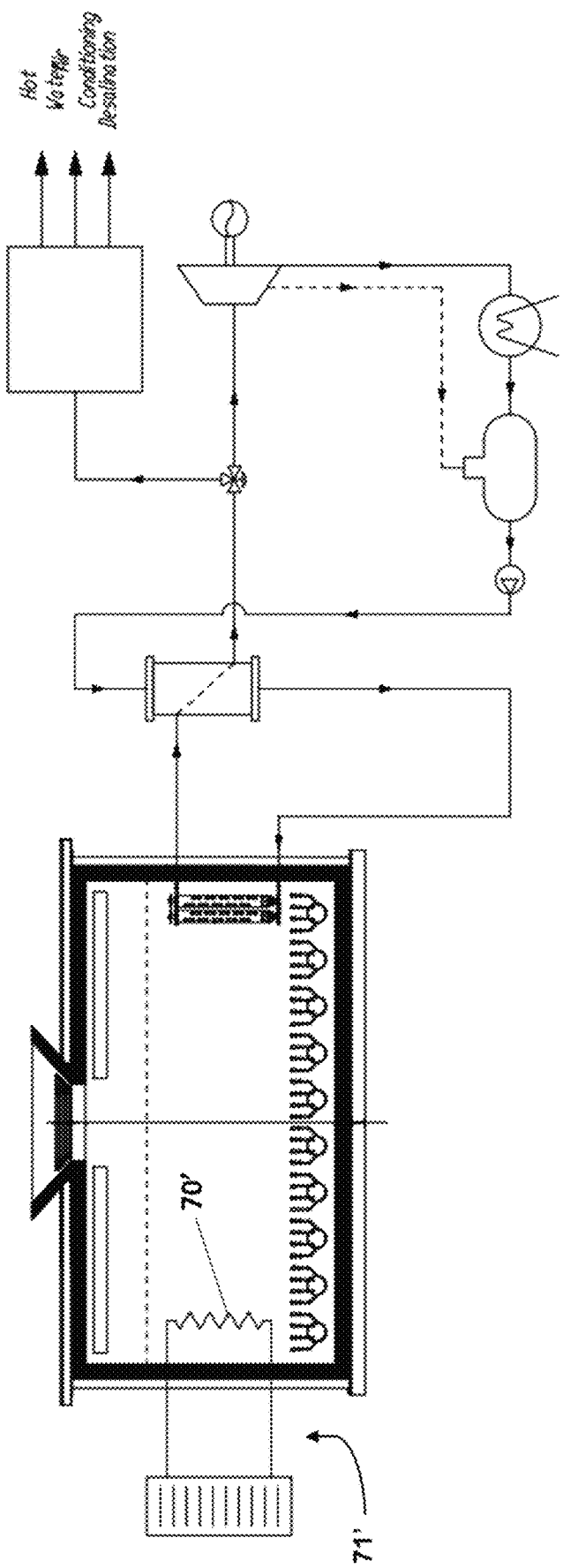
FIG. 3d relates to the same embodiment variant of FIG. 2d, in an alternative configuration of open type, by showing a schematic representation thereof in longitudinal section.

Similarly to what illustrated for the other embodiments, FIGS. 3b, 3c and 3d show, each one, a respective embodiment variant of the device of FIG. 3a, wherein the electric resistors 7 are replaced by several heating means or components of the bed of particles, indeed configured to convert an inlet energy, in particular electric energy, into heating thermal energy of the bed of particles 3.

In FIG. 3b, inside the bed of particles 3 heat exchangers 70 are positioned belonging to a circuit of a heat pump 71, the latter comprising a second exchanger 72, in contact with a low temperature source, a compressor 73 and a lamination valve 74.

In the variant of FIG. 3d, the exchangers immersed into the bed of particles, designated with 70', are part of a heat exchange circuit 71' based upon the use of an operating fluid.

In FIG. 3c, inside the circuit for supplying the fluidization gas, air heaters 700 are inserted which increase the temperature of the gas inletting the bed of particles 3, by allowing to increase the contained thermal energy thereof.

Figure 4A:
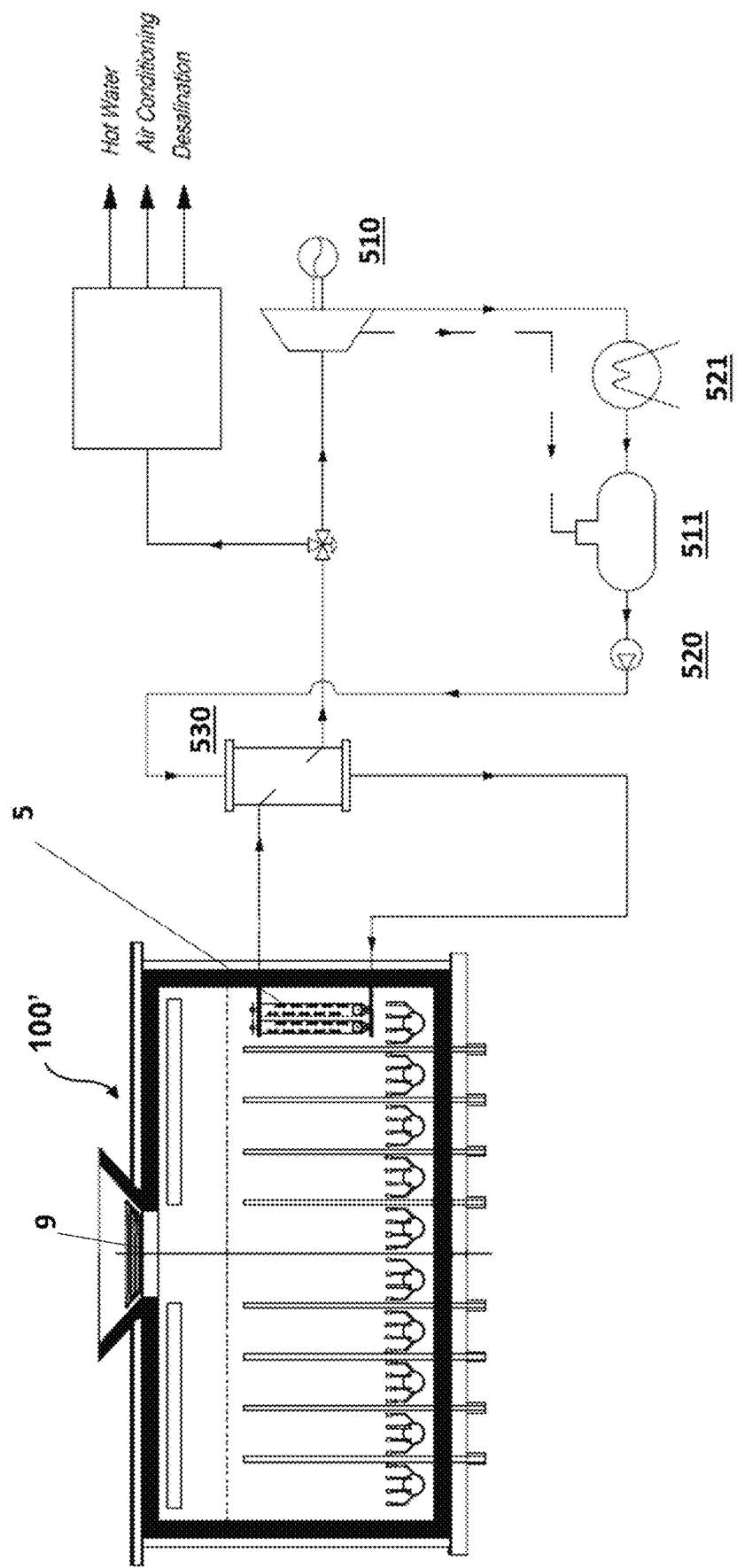
FIG. 4a relates to a fourth preferred embodiment of the device for accumulating and transferring thermal energy of a plant according to the invention, wherein in the configuration of FIG. 3a heat exchangers inserted into the bed of particles have been added, by showing a schematic representation thereof in longitudinal section.

With reference to FIG. 4a, this illustrates schematically a fourth embodiment of the device of the invention, herein designated with 100'. Similarly to the configuration of FIG. 2a, the device 100' is different from the one described with reference to FIG. 3a due to the fact of having further heat exchange elements housed within the bed 3, in particular tube bundles 5. The configuration of said tube bundles and of further plant components associated thereto is the same already described above indeed with reference to FIG. 2a.

The auxiliary device 9 can be independent from the heat exchange elements 5 immersed into the bed of particles or it can be connected thereto.

Figure 4B:
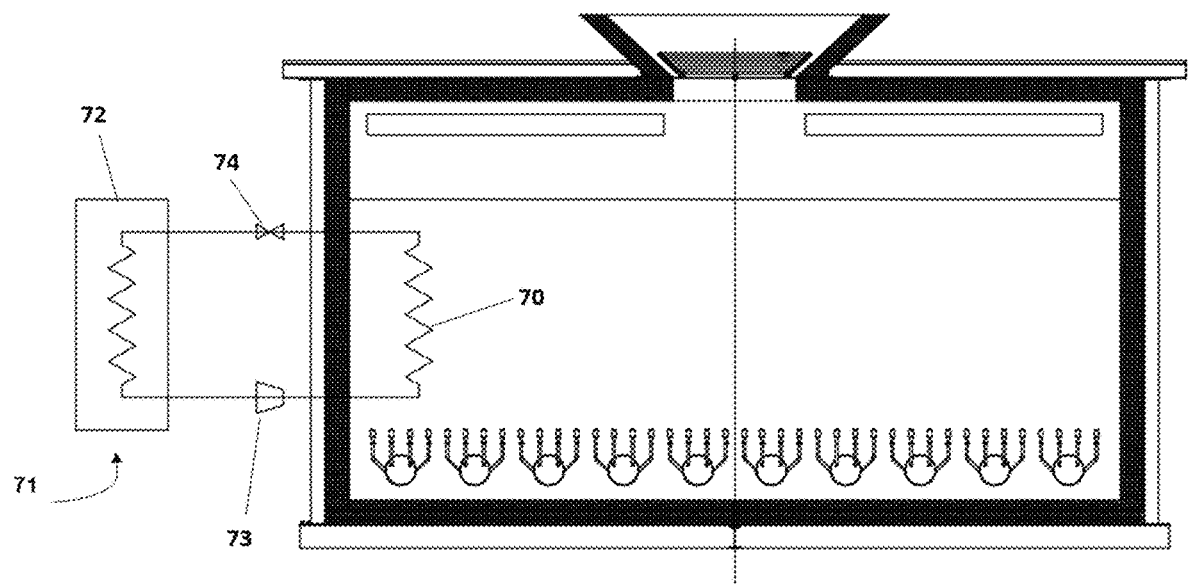
FIG. 4b relates to the same embodiment variant of FIG. 1b, in an alternative configuration of open type, by showing a schematic representation thereof in longitudinal section.
Figure 4C:
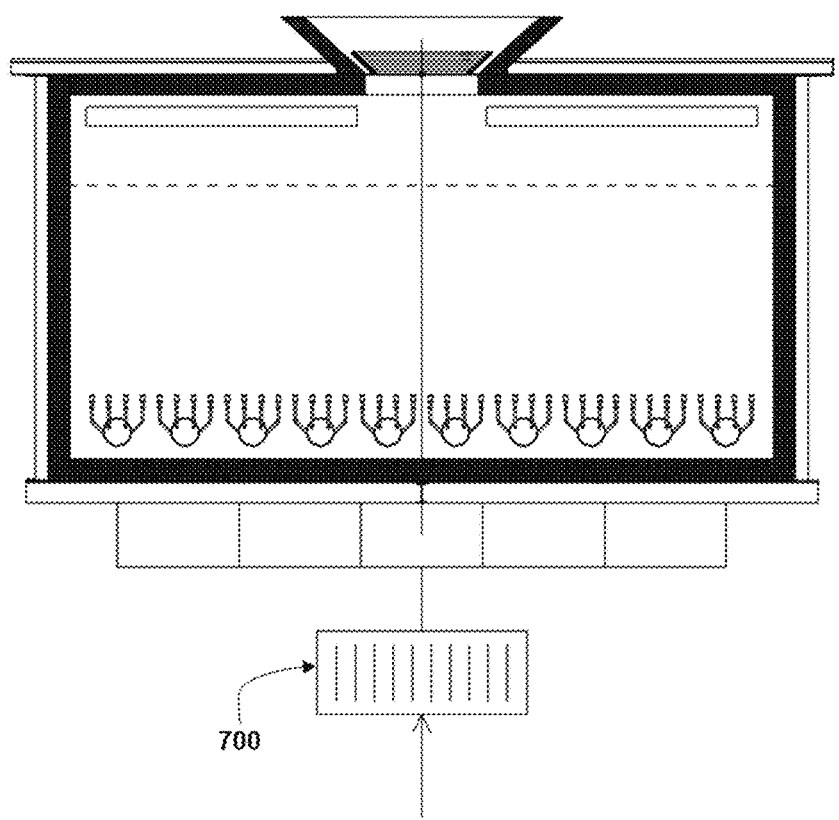
FIG. 4c relates to the same embodiment variant of FIG. 1c, in an alternative configuration of open type, by showing a schematic representation thereof in longitudinal section.
Figure 4D:
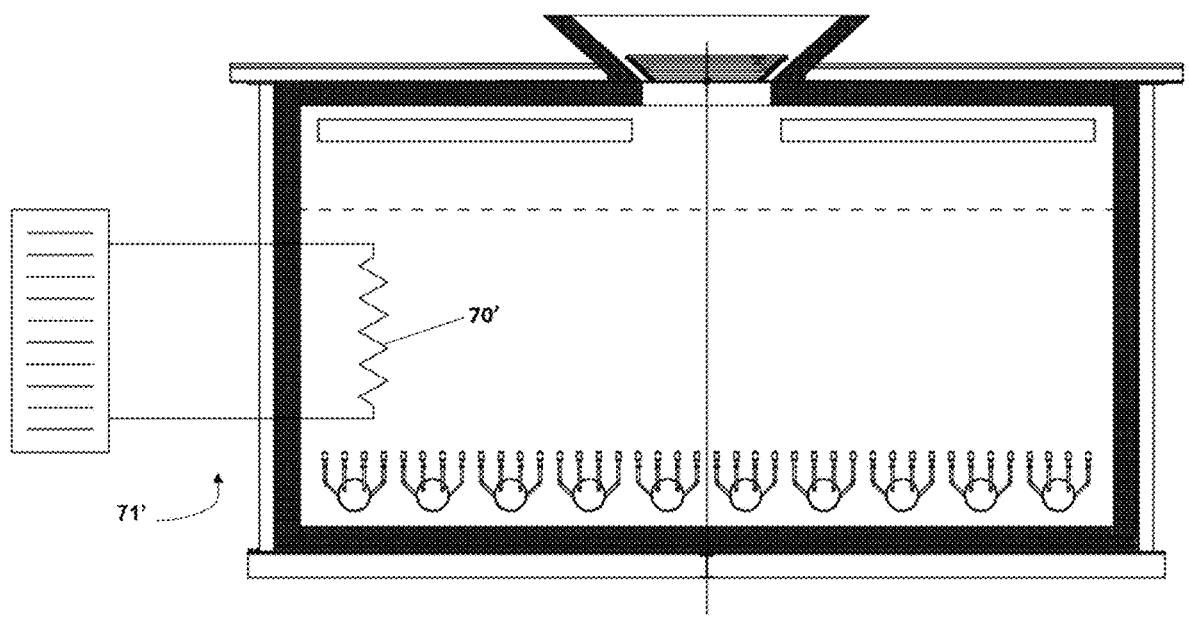
FIG. 4d relates to the same embodiment variant of FIG. 1d, in an alternative configuration of open type, by showing a schematic representation thereof in longitudinal section.

The FIGS. 4b, 4c and 4d show each one a respective embodiment variant of the device of FIG. 4a, wherein the electric resistors 7 are replaced by several heating means or components of the bed of particles, indeed configured to convert an inlet energy, particularly electric energy, into heating thermal energy of the bed of particles 3.

In FIG. 4b, inside the bed of particles 3 heat exchangers 70 are positioned belonging to a circuit of a heat pump 71, the latter comprising a second exchanger 72, in contact with a low temperature source, a compressor 73 and a lamination valve 74.

In the variant of FIG. 4d, the exchangers immersed into the bed of particles, designated with 70', are part of a heat exchange circuit 71' based upon the use of an operating fluid.

In FIG. 4c, inside the circuit for supplying the fluidization gas, air heaters 700 are inserted which increase the temperature of the gas inletting the bed of particles 3, by allowing to increase the contained thermal energy thereof.

In the "open" configurations like those just described with reference to FIGS. 3a-3d and 4a-4d, the accumulation and transfer device can provide components of thermionic and/or thermoelectric and/or thermo-photovoltaic type, arranged outside the casing 2, for example around the irradiation opening 10, of the same type of the components 8 mentioned with reference to FIGS. 1a and 2a and configured for feeding the resistances 7 or the other heat exchange components introduced above with reference to the several embodiment variants.

A possible additional, not illustrated, configuration, of the invention device, both in "closed" and "open" form, provides that the transfer of thermal energy from the accumulation device takes place, alternatively or together with the described modes, by using directly the hot fluidization gas outgoing from the bed of particles. Such gas, wholly or partially used, is preferably dusted by cyclones or ceramic filters resistant to high temperatures, before it is sent to the downstream users.

As mentioned above, each one of the sofar described devices can be inserted in a plant configured for accumulating energy in thermal form. Some possible additional plant configurations are described hereinafter.

Figure 5:
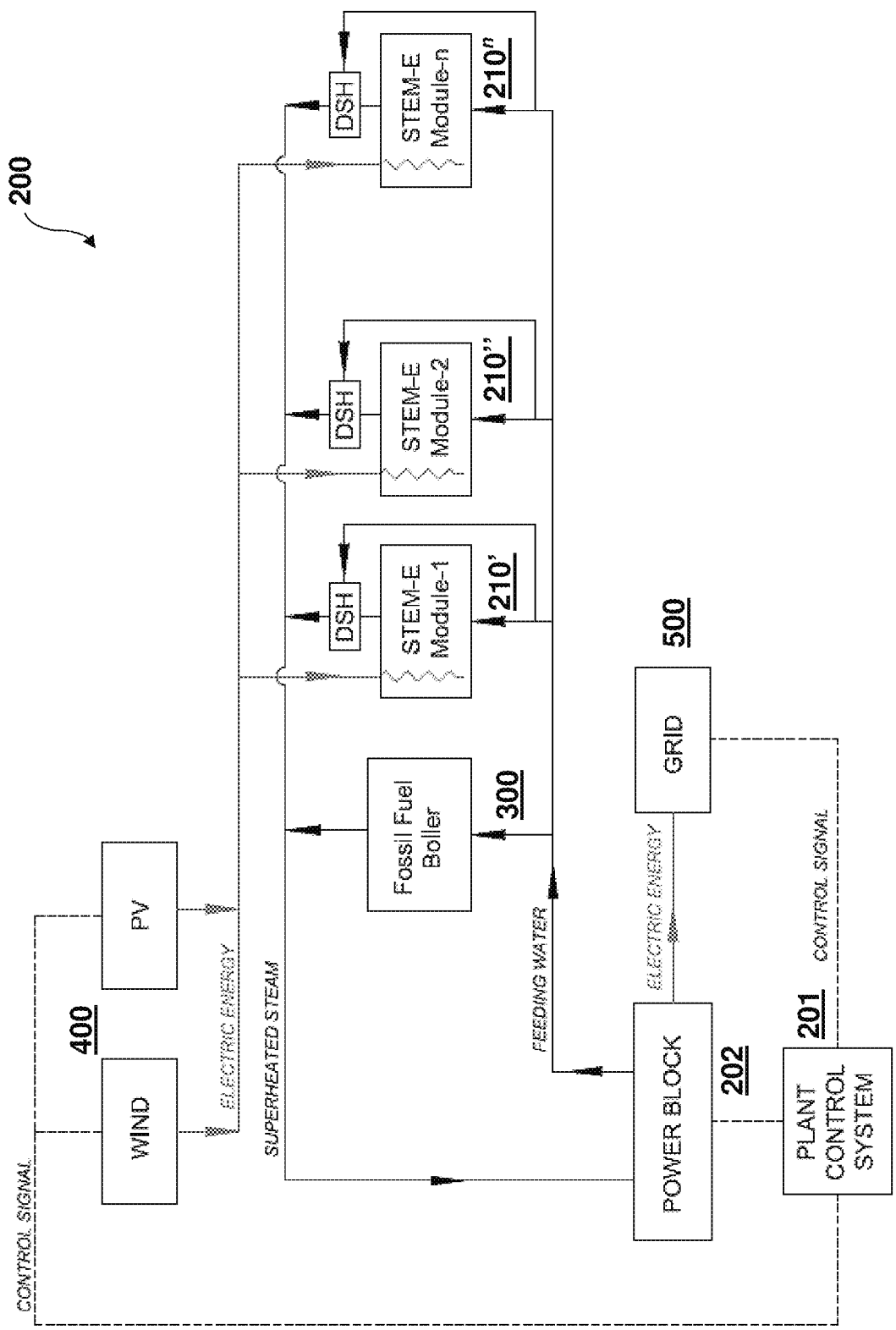
FIG. 5 shows a block diagram of an energy accumulation plant according to a preferred embodiment of the invention, which comprises accumulation devices according to anyone of the above-mentioned embodiments and embodiment variants, each one implementing a respective accumulation module, which plant is fed by renewable sources and inserted inside an existing thermoelectric power plant.

FIG. 5 shows a block diagram of a plant according to a preferred embodiment of the invention, which is designated as a whole with 200. The plant 200 comprises a plurality of devices according to anyone of the above-mentioned embodiments and embodiment variants, each one implementing a respective accumulation module. In the represented example, n accumulation devices, respectively designated with 210', 210", 210" are exemplified. Preferably, the above-mentioned devices are of the type without irradiation opening and then implemented, for example, according to the embodiment variants of FIGS. 1a-1d o 2a-2d. In the proposed configuration, it is provided that the thermal energy accumulated by the above-mentioned modules is used for the steam production.

The plant 200 is fed by renewable sources 400, which in figures are exemplified with a wind and a photovoltaic source, to exploit the exceeding electric energy thereof. In the herein considered embodiment, the plant is inserted inside, or it incorporates, an existing thermoelectric plant, in particular comprising a fossil fuel boiler 300 and a turbine belonging to a generation system or power block 202.

According to the demand from the grid, the plant 200 provides for the release of thermal energy by means of suitable heat exchangers, or heat exchange elements, included in each module, for the generation of steam to be sent to the generation system, or power block, 202, in this case already pre-existing in the plant, for the production of electric energy.

The plant 200 is managed by means of a control system, or unit, 201, which controls, in particular, the energy flows inletting the accumulation modules 210'-210", the power block 202 and the energy supply to the grid ("grid") 500.

In the herein exemplified configuration, the number of accumulation modules depending upon the area available for the plant in proximity of the generation group 202 can be so as to generate the same thermal power of the already existing boiler 300 or only a fraction thereof, by eliminating or reducing the consumption of the fossil fuel and the corresponding emission of $CO_2$ in the environment.

The number of installed modules can be initially limited and subsequently increased to reach the same generation of thermal power of the boiler 300.

Figure 6:
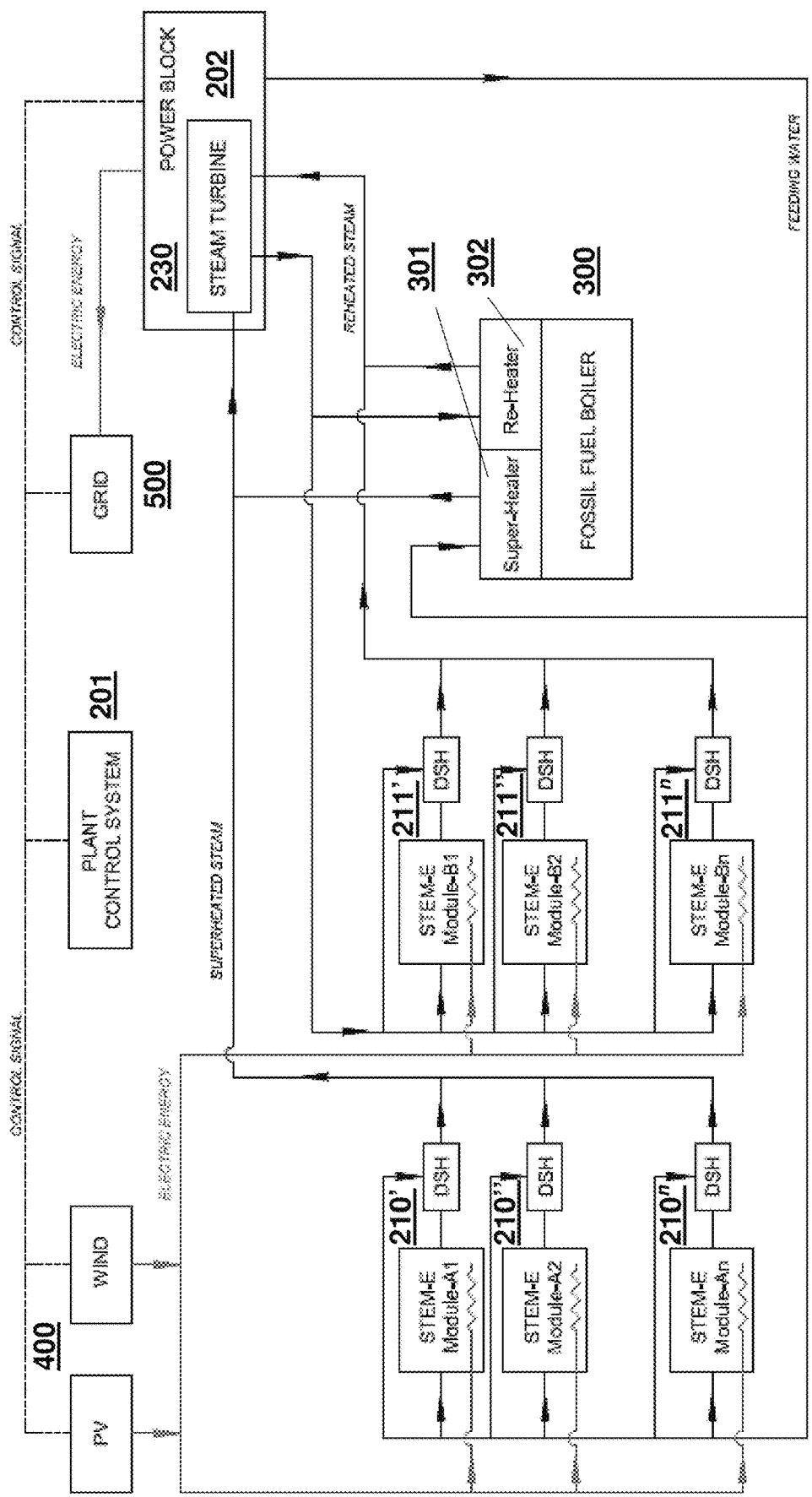
FIG. 6 shows a block diagram of a variant of the configuration of FIG. 5, wherein a turbine performing a steam re-superheating is inserted.

FIG. 6 shows a block diagram of a variant of the configuration of FIG. 5, wherein in the generation group 202 a turbine 230 is inserted, performing a steam re-superheating.

In the cycle of the plant variant exemplified in FIG. 6, the steam re-heating ("re-heating") is provided, allowing an increase in the production effectiveness. Such re-heating is performed by means of additional accumulation modules designated with 211'-211", of the type, too, already described with reference to the above-illustrated devices.

The set of the modular devices then is preferably divided into two sections, wherein the modules of both sections accumulate thermal energy by converting the electric energy from renewable sources 400. The produced steam, outgoing from the first section of modules 210'-210" is introduced in turbine 230 and, after a first expansion step, brought back to the other section of modules 211'-211", for the steam re-heating which is then introduced again in the turbine 230.

In the represented configuration, a boiler with solid fuel 300 is however provided, integrating the steam superheating through two dedicated lines or sections 301 and 302.

Figure 7:
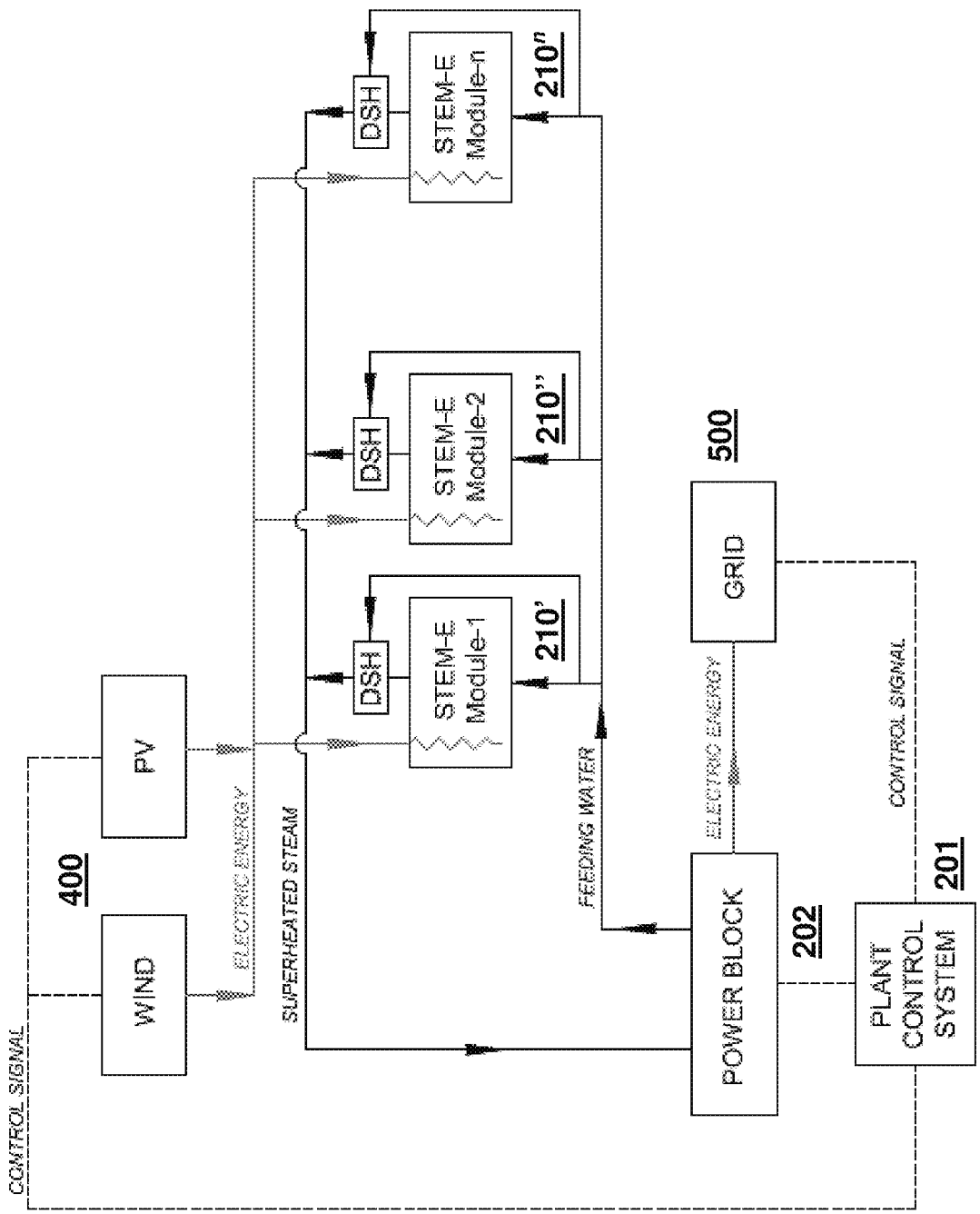
FIG. 7 shows a block diagram of an energy accumulation plant according to another preferred embodiment of the invention, which plant produces electric energy and comprises accumulation devices according to anyone of the above-mentioned embodiments and embodiment variants, each one implementing a respective accumulation module, which plant is fed by renewable sources and wherein said devices replace a traditional boiler.

FIG. 7 shows a block diagram of an energy accumulation plant according to another preferred embodiment variant of the invention. With respect to what already described in relation to FIG. 5, in the herein considered plant, the accumulation modules 210'-210n wholly replace the fossil fuel boiler.

Figure 8:
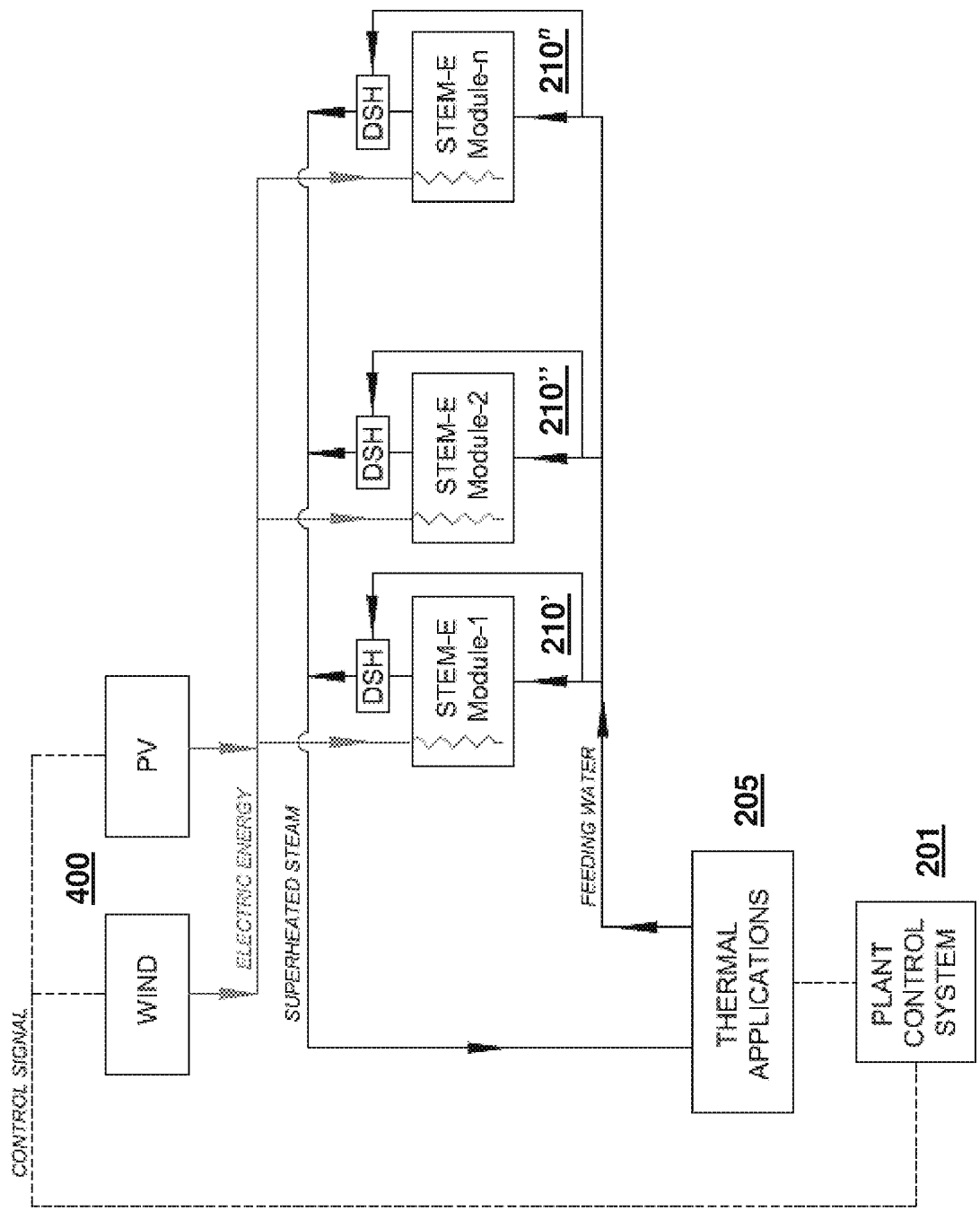
FIG. 8 shows a block diagram of an energy accumulation plant according to an additional preferred embodiment of the invention, which plant produces thermal energy and comprises accumulation devices according to anyone of the above-mentioned embodiments and embodiment variants, each one implementing a respective accumulation module, which plant is fed by renewable sources.

FIG. 8 shows a variant of the scheme of FIG. 7, wherein the produced energy is used for thermal users 205. The herein considered plant, as for the preceding configurations, accumulates thermal energy by converting electric energy from renewable sources and transfers thermal energy depending upon the demand to connected thermal users.

Figure 9:
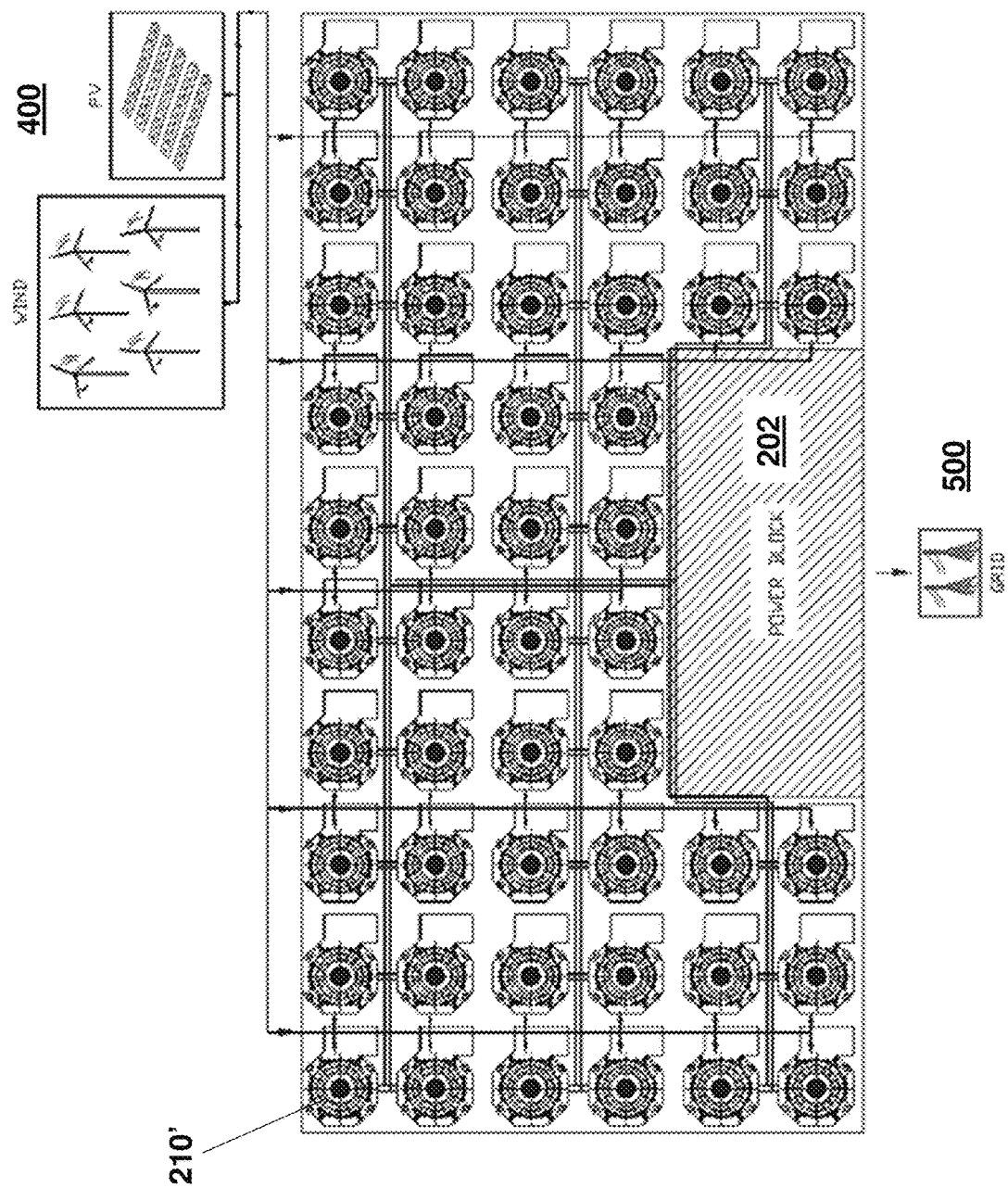
FIG. 9 shows a schematic representation of an accumulation plant lay-out according to a preferred embodiment of the invention, which comprises 50 modules each one based upon a respective accumulation device according to anyone of the above-mentioned embodiments and embodiment variants.

FIG. 9 shows a schematic representation of a lay-out of accumulation plant according to a preferred embodiment of the invention, which comprises 50 modules, each one based upon a respective accumulation device according to anyone of the above-mentioned embodiments and embodiment variants. The modules accumulate thermal energy by converting electric energy from renewable sources and upon request produce electric energy by means of a dedicated generation group.

The modular system like the exemplified one is capable of reaching any required energy accumulation level by occupying due to its high power density small spaces for example 5 hectares—100 thermal modules—3000 MWh which by feeding a turbine having effectiveness of 40% is equal to 1200 electric MWh capable of feeding a city with 1,000,000 of inhabitants.

In all above-described preferred configurations, each accumulation module is provided with a system for tempering the produced steam to adapt the fluid temperature to the operating parameters of the connected users.

Moreover, as already said each plant configuration provides a control system which manages the steps for accumulating the thermal energy in the single module and, if needed, its release as such or under the form of electric energy.

In this context, additional co-generative configurations are possible for the combined production of electric energy and thermal energy.

As above illustrated, the possibility of accumulating huge amounts of thermal energy allows to use even existing fossil fuel power plants, instead of new suitably devised and constructed turbine/generator groups. The latter possibility can bring considerable economic and environmental advantages to the economy of the transition nowadays currently performed by the electric energy produced with fossil fuels to the electricity produced by renewable sources.

The invention further provides a method for accumulating and transferring thermal energy, based upon the functionalities already described above in relation to the plant of the invention.

The subject of the present invention has been sofar described with reference to preferred embodiments thereof. It is to be meant that other embodiments belonging to the same inventive core may exist, all belonging to the protective scope of the herebelow reported claims.

The invention claimed is:

1. A plant for the accumulation of energy in thermal form, comprising an accumulation device, said accumulation device having:
   a containment casing;
   a bed of fluidizable solid particles received within said containment casing;
   heating means thermally connected with said bed, which heating means is configured to transmit thermal energy to the fluidizable solid particles; and
   heat exchange means, also thermally connected to said bed and selectively activated to receive thermal energy therefrom,
   the overall configuration being such that said thermal energy is transferred from the heating means to the fluidizable solid particles and said plant is capable of selectively transferring said thermal energy, in simultaneous and deferred manner, from said fluidizable solid particles to said heat exchange means, wherein the plant is configured to feed said heating means by means of excess electric energy or by means of residual thermal energy from industrial processes.

2. The plant according to claim 1, wherein said heating means is arranged within said containment casing and in contact with the fluidizable solid particles.

3. The plant according to claim 1, wherein said heating means comprises electric resistor means arranged within said containment casing and thermally connected with said bed, which electric resistor means is configured to generate thermal energy by Joule effect and to transmit it to the fluidizable solid particles.

4. The plant according to claim 3, wherein said electric resistor means is arranged, at least partially, immersed in, or so as to be lapped by, said bed.

5. The plant according to claim 3, wherein said electric resistor means comprises one or more oblong elements extending longitudinally in an orthogonal direction to a free surface of said bed.

6. The plant according to claim 1, wherein said heating means and/or said heat exchange means have layers, or screens, of material resistant to high temperatures.

7. The plant according to claim 1, wherein said heating means is arranged externally to said casing.

8. The plant according to claim 7, wherein said heating means is thermally connected to a circuit of a fluidization gas of said fluidizable solid particles and configured to heat said gas before it enters said containment casing.

9. The plant according to claim 1, wherein said heating means comprises heat exchangers crossed, in use, by an operating fluid in liquid or vapor form.

10. The plant according to claim 1, wherein said heating means is part of a circuit of a heat pump device.

11. The plant according to claim 1, wherein said heat exchange means comprises one or more of the following components: thermoelectric elements; thermionic elements; thermo-photovoltaic elements; tube bundles configured to be crossed, in use, by an operating fluid.

12. The plant according to claim 1, wherein said containment casing has an irradiation opening configured to allow the entry of an incident solar radiation, so that said bed receives thermal energy from said incident solar radiation.

13. The plant according to claim 12, wherein said irradiation opening puts in direct communication an inner compartment of said containment casing with the external environment, being devoid, in use, of closing or shielding means.

14. The plant according to claim 12, wherein said irradiation opening is arranged at an upper wall of said containment casing, so that said bed of fluidizable solid particles, or a part thereof, is directly exposed, in use, to the incident solar radiation.

15. The plant according to claim 1, wherein said containment casing is closed with respect to the outside.

16. The plant according to claim 1, further comprising fluidizing means configured for introducing a fluidizing gas into said bed.

17. The plant according to claim 16, further comprising means for selectively varying the speed or the flow rate of the fluidizing gas.

18. The plant according to claim 16, wherein said fluidizing means is configured for an independent fluidization of selected parts of said bed.

19. The plant according to claim 1, comprising means for the production of electric energy arranged downwards of said accumulation device.

20. The plant according to claim 1, comprising a plurality of accumulation devices arranged thermally in series or in parallel to an operating fluid crossing the heat exchange means of each accumulation device.

21. A plant for the accumulation of energy in thermal form,
comprising an accumulation device, said accumulation device having:
a containment casing;
a bed of fluidizable solid particles received within said containment casing;
heating means thermally connected with said bed, which heating means is configured to transmit thermal energy to the fluidizable solid particles; and
heat exchange means, also thermally connected to said bed and selectively activated to receive thermal energy therefrom,
the overall configuration being such that said thermal energy is transferred from the heating means to the fluidizable solid particles and said plant is capable of selectively transferring said thermal energy, in simultaneous and deferred manner, from said fluidizable solid particles to said heat exchange means,
wherein the plant is configured to feed said heating means by means of excess electric energy or by means of residual thermal energy from industrial processes,
wherein the plant comprises heating means arranged externally to said casing, wherein said heating means are thermally connected to a circuit of a fluidization gas of said fluidizable solid particles of said bed and configured to heat said gas before it enters said containment casing, and wherein said heating means comprises heat exchangers crossed, in use, by an operating fluid in liquid or vapor form that is separate from the fluidization gas.

22. A method for accumulating energy in thermal form, comprising:
producing thermal energy by heating means arranged in thermal connection with a bed of fluidizable solid particles, which heating means is fed by means of excess electric energy, or by means of residual thermal energy;
accumulating thermal energy in said bed of fluidizable solid particles; and
transferring the accumulated thermal energy to heat exchange means, for transforming the thermal energy of said fluidizable solid particles into electric energy or for transferring said thermal energy to the outside,
wherein the method uses a plant according to claim 21.

* * * * *